(12) United States Patent
Trani

(10) Patent No.: US 6,465,061 B2
(45) Date of Patent: *Oct. 15, 2002

(54) PAPER COMPOSITE FOR MAKING PACKAGES FOR LIQUID OR GRANULAR PRODUCTS

(76) Inventor: Giorgio Trani, Giudecca 671, Venezia (IT), 30100

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/750,857
(22) PCT Filed: Jul. 21, 1995
(86) PCT No.: PCT/EP95/02894
§ 371 (c)(1),
(2), (4) Date: Dec. 31, 1996
(87) PCT Pub. No.: WO96/03281
PCT Pub. Date: Feb. 8, 1996

(65) Prior Publication Data
US 2002/0061370 A1 May 23, 2002

(30) Foreign Application Priority Data
Jul. 22, 1994 (IT) .......................... PD9400138

(51) Int. Cl.[7] .......................... B32B 23/06; B32B 23/08; B32B 29/06
(52) U.S. Cl. .......................... 428/34.2; 53/453; 53/561; 156/285; 156/287; 156/290; 156/292; 264/512; 264/520; 264/521; 264/524; 264/544; 264/545; 428/220; 428/537.5; 493/338; 493/339
(58) Field of Search .................. 428/34.2, 34.3, 428/537.5, 220; 264/512, 544, 545, 524, 520, 521; 156/285, 287, 290, 292; 53/453, 561; 493/338, 339

(56) References Cited

U.S. PATENT DOCUMENTS

| 3,865,667 | A | * | 2/1975 | Ferrari ........................ 156/145 |
| 4,026,458 | A | * | 5/1977 | Morris et al. .................. 229/30 |
| 4,048,361 | A | * | 9/1977 | Valyi ............................ 428/35 |
| 4,147,836 | A | * | 4/1979 | Middleton et al. .......... 428/481 |
| 4,435,344 | A | * | 3/1984 | Iioka .......................... 264/45.1 |
| 4,938,001 | A | * | 7/1990 | Vico ............................ 53/128 |
| 5,009,939 | A | * | 4/1991 | Goldberg ................... 428/34.2 |
| 5,169,470 | A | * | 12/1992 | Goldberg ............... 156/244.14 |

FOREIGN PATENT DOCUMENTS

| CH | 486303 | 4/1970 |
| EP | 0082209 | 12/1981 |
| EP | 0419068 | 8/1990 |
| FR | 2267248 | 4/1974 |
| JP | 6-64111 A | * 3/1994 |
| JP | 6-255042 A | * 9/1994 |

* cited by examiner

*Primary Examiner*—Sandra M. Nolan
(74) *Attorney, Agent, or Firm*—Hoffman, Wasson & Gitler

(57) ABSTRACT

A paper composite for realizing packages in three-dimensional form having a layer of yieldable paper with a degree of yieldingness in any direction not less than 10% and impermeablilizing film having a yieldingness compatible with yieldable paper. A method for realizing packages where a leaf of composite is faced to a cavity of at least a mould, the leaf being bounded in correspondence of a continuous edge of the cavity, and subsequently tangentially stretching the leaf of composite to adhere to an inner surface of the cavity to obtain a concave valve. The valve has the shape of the cavity. The package obtained is a concave container having a closure film applied to the filling, and may have two concave valves joined together along the facing edges.

20 Claims, 3 Drawing Sheets

PAPER COMPOSITE FOR MAKING PACKAGES FOR LIQUID OR GRANULAR PRODUCTS

FIELD OF THE INVENTION

This invention relates to a paper composite for realizing three-dimensional packages for possibly solidifiable products in the liquid state, or for granular or powder products, a method for realizing such packages and a package obtained through the method.

BACKGROUND OF THE INVENTION

Methods for packaging in metered quantities possibly solidifiable liquid products or granular or powder products for consumption are known. In one of these methods, half-casings of substantially rigid plastics material for example polypropylene are thermoformed and joined together along their edges to form a cavity, which can then be filled by a traditional filling machine. If the product is to be used in the liquid state, granular state or powder state the package obtained in this manner is ready for marketing after sealing. If however the product is to be used in the solid state (for example ice-creams), after the filling operation the filled with the liquid product and sealed package is refrigerated and preserved under refrigerated conditions until its consumption.

Independently of the nature of the packaged material, these known packages have the advantage of being formable in practically any shape, but also have certain drawbacks, and in particular:

- a considerable cost, related to the cost of the plastics material used,
- practically no ecological merits, given the non-biodegradable nature of the plastics used,
- a certain weight, with consequent transport costs,
- a space requirement after use, in that the used package cannot be substantially reduced in volume compared with the full package.

It is also known to package generally liquid products using a continuous tubular element of polyethylene-coated cardboard which is filled in portions separated by transverse welds, transverse cuts then being made through said welds. The package is generally of tetrahedral, parallelpiped or cylindrical shape, depending on the manner in which the transverse welds are made and on the folding operations to which the package may be subjected after its separation from the continuous tubular element.

This known method considerably accelerates the packaging operations but has certain limitations both in terms of obtainable shapes, and of overall dimensions, of the package after its use, and of costs.

SUMMARY OF THE INVENTION

An object of the invention is to eliminate such drawbacks and to realize a composite for forming metered packages, practically of any shape, for products in the liquid, granular or powder state, which has a low cost.

A further object of the invention is to realize very light packages, such as to minimize packing and transport costs.

A further object of the invention is to provide a method which enables the package to be reduced to minimum volume after use.

A further object of the invention is to provide a method which enables traditional commercially available packaging equipment to be used.

All these objects are attained according to the invention through a paper composite for realizing packages in three-dimensional form having a layer of yieldable paper with a degree of yieldingness in any direction not less than 10% and impermeablilizing film having a yieldingness compatible with yieldable paper.

The invention also foresees a method for realizing packages where a leaf of composite is faced to a cavity of at least a mould, the leaf being bounded in correspondence of a continuous edge of the cavity, and subsequently tangentially stretching the leaf of composite to adhere to an inner surface of the cavity to obtain a concave valve. The valve has the shape of the cavity.

The package so obtained a concave container having a closure film applied to the filling, and may have two concave valves joined together along the facing edges.

DETAILED DESCRIPTION OF THE DRAWINGS

The present invention is described in detail hereinafter with reference to the accompanying drawings, in which:

FIG. 1 shows in enlarged section view a portion of paper composite according to the invention;

FIG. 2 schematically illustrates a line for implementing the method of the invention;

Figure 7:
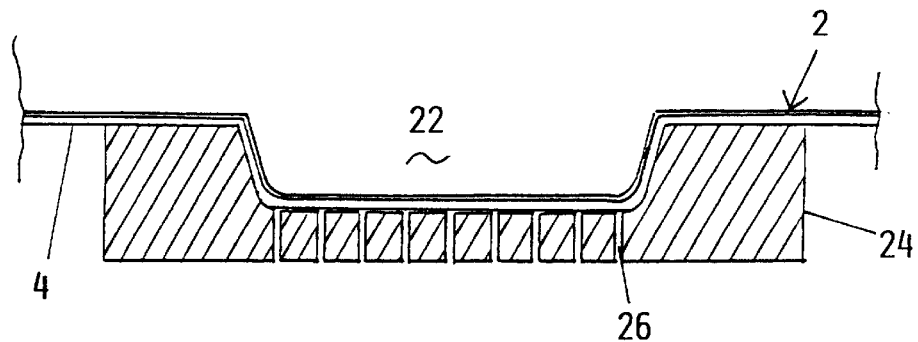
Figure 8:
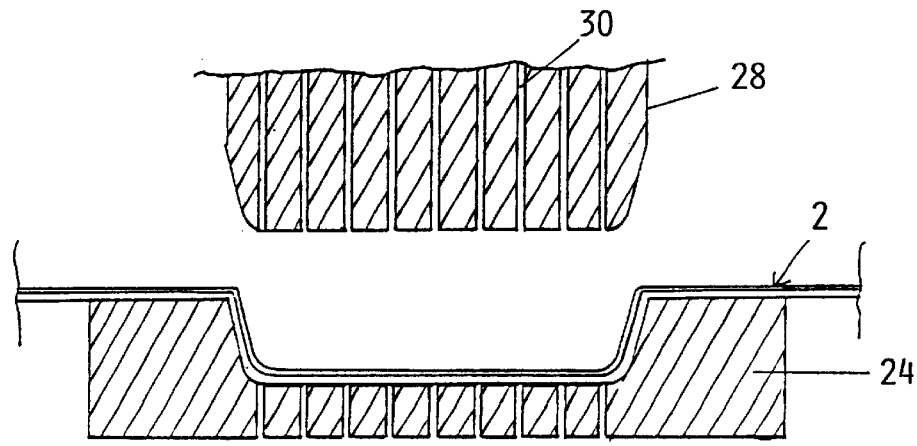
Figure 9:
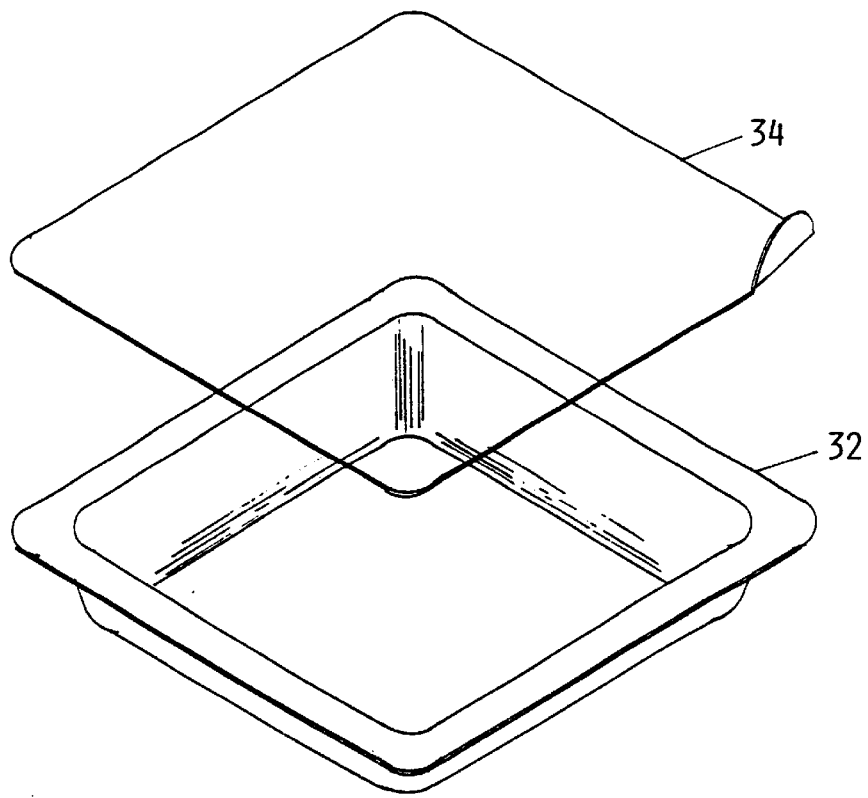

FIG. 7 schematically shows in cross section view an open mould to implement the method in a different embodiment, FIG. 8 is the same mould as FIG. 7 in a further embodiment, and FIG. 9 shows a package extracted from the mould and awaiting filling.

DETAILED DESCRIPTION OF THE PREFERRED EMBODIMENTS

As can be seen from the figures, the paper composite 2 according to the invention consists of a layer of yieldable paper 4 and of an impermeable plastic film 6. The yieldable paper 4 presents a degree of yieldingness such as it enables it to be permanently extended transversely and longitudinally by at least 10%, and preferably by 20% and specifically by an extent such as to enable the desired final configuration without laceration of the package to be obtained.

The plastic film 6 is preferably of polyethylene or another possibly peelable thermoplastic material with degree of yieldingness not lesser than that of the layer of yieldable paper to which it couples and with suitable weldability characteristics. The film 6 may also include an aluminum alloy.

The joint between the two layers 4 and 6 is preferably formed continuously by traditional methods, which do not form part of the invention and are not further described. In the embodiment shown in FIG. 2 the composite 2 is wound around a reel 8 and is folded longitudinally so that the two polyethylene layers 6 face each other.

Figure 1:
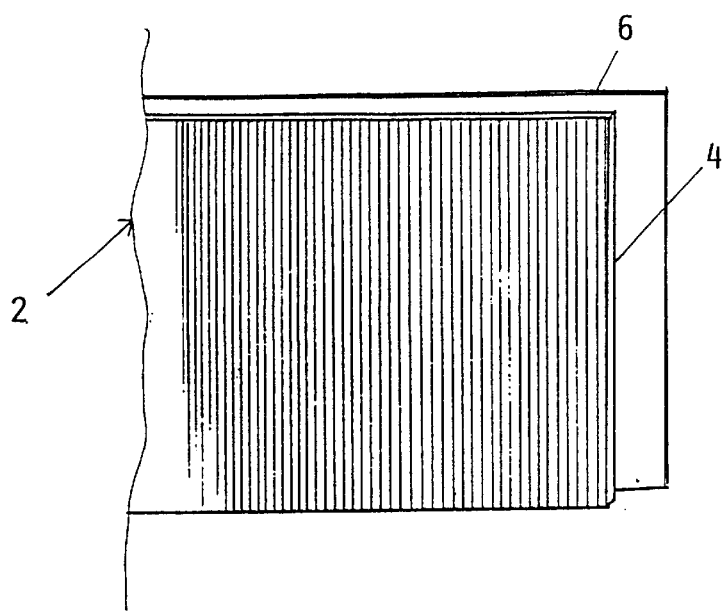
Figure 2:
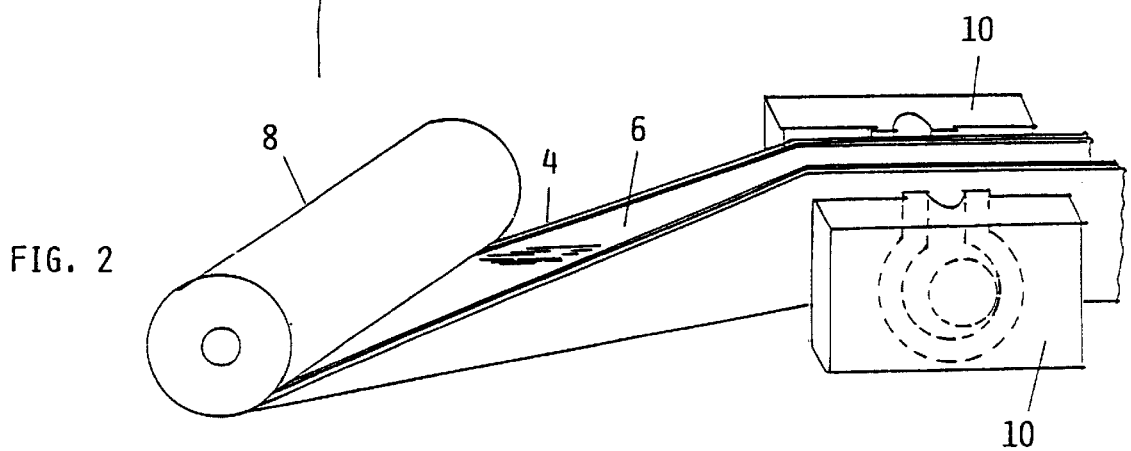
Figure 3:
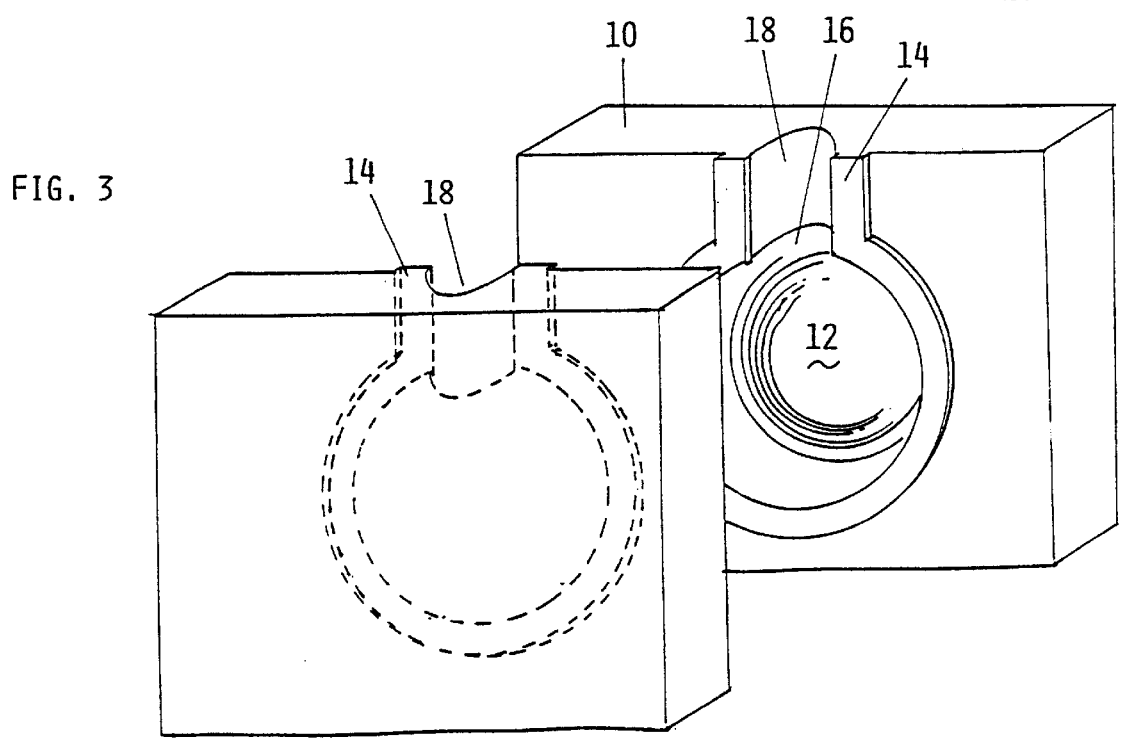
FIG. 3 is an enlarged perspective view of the open mould of FIG. 2.
Figures 4, 5:
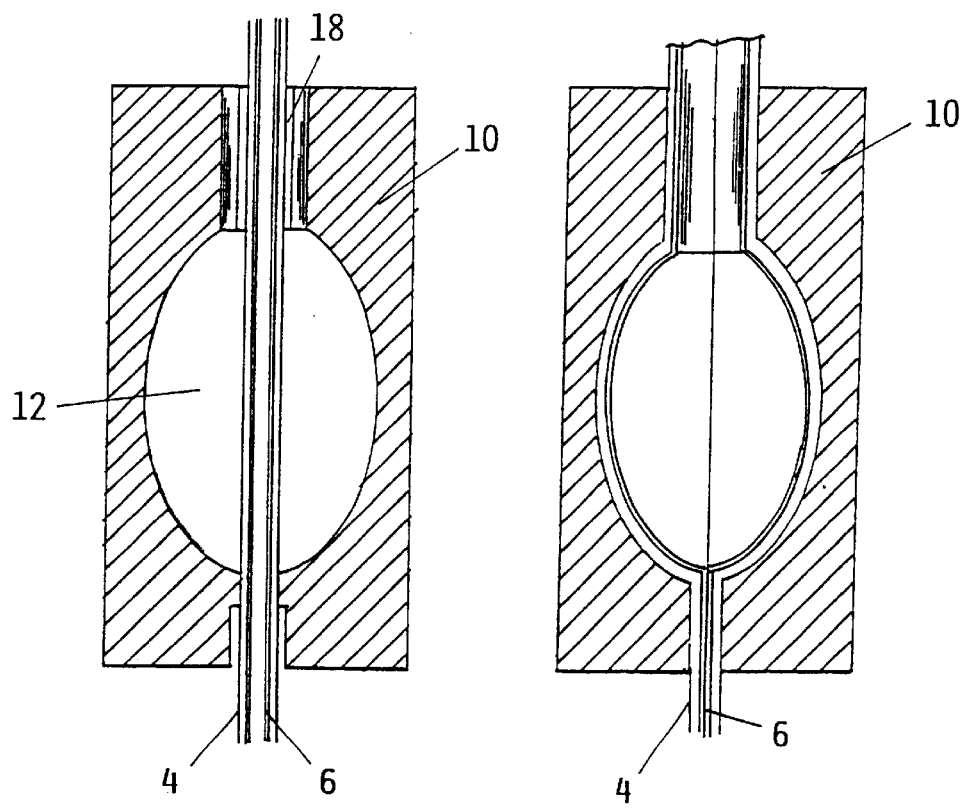
FIG. 4 is a vertical section through a closed mould during the stage preceding the introduction of the pressurized fluid.
FIG. 5 shows the same view as FIG. 4, but during the stage following the introduction of the pressurized fluid.

In the embodiment shown in FIGS. 2–4 the method of the invention also uses a mould formed from two half-moulds 10 movable relative to each other and each comprising a cavity 12 bounded by a slightly projecting rim 14 comprising an interruption 16. The cavities 12 of the half-moulds 10, the projecting rims 14 which bound them and the interruptions 16 in the projecting rims 14 perfectly mate when the two half-moulds 10 are brought together.

In the drawings the two half-moulds 10 are shown for simplicity with a single impression, whereas in practice it is preferable to use moulds with several impressions to accelerate the packaging operations.

It is also foreseen that the cavity 12 of each half-mould 10 extends externally into a duct 18 which opens into the interruption 16 provided in the rim 14 bounding the cavity 12, and mates with the adjacent duct of the other half-mould 10.

The method of the invention is as follows: after the composite 2 has been folded longitudinally into two parts and has been positioned in this folded state between the two half-moulds 10, these are brought together so as to retain it between them (see FIG. 4). The two contacting rims 14 are then heated so that they thermoweld together the two polyethylene layers 6 lying between them, but with the exception of the interruption 16.

After the thermoweld has been made, compressed air is introduced through the duct 18, which air may be also hot, with the double purpose of heating the polyethylene 6 in order to soften and sterilize it, and to stretch the two sheets of yieldable paper 4 retained between the rims 14 to cause them to adhere to the surface of the respective cavity 12 (see FIG. 5). The stretching of the paper is facilitated by the softening of the polyethylene.

Figure 6:
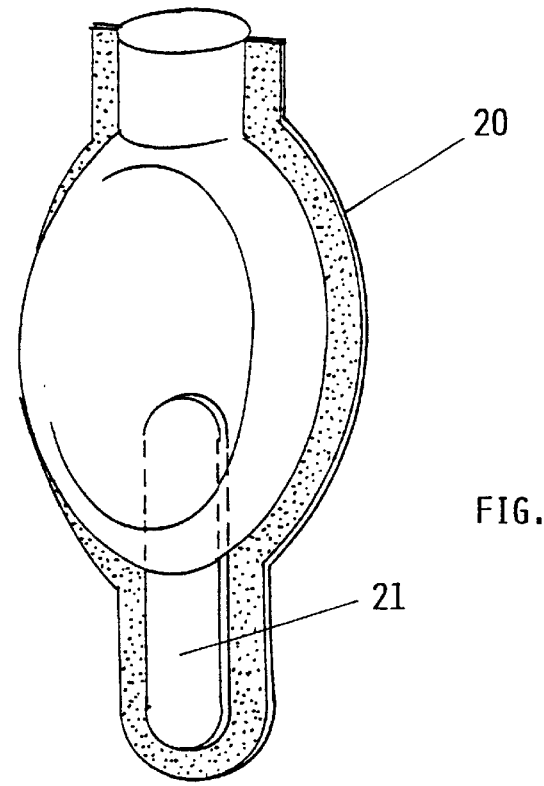
FIG. 6 is a perspective view of a package extracted from the mould and awaiting filling.

After this insufflation stage the two half-moulds 10 are separated to allow removal of the internally impermeabilized paper package 20 having a configuration corresponding to the cavities of the half-moulds 10, this configuration being stable because of the permanent deformation to which the yieldable paper 4 and the polyethylene 6 forming the composite have been subjected (see FIG. 6). The half-moulds 10 may be kept or maintained in a heated condition during the insufflation stage while the compressed air or fluid is injected.

This package can then be transferred to the filling stage, preferably effected with automatic machines, and then to the stage for sealing the polyethylene 6 at the interruption 16, through which the product to be packaged was introduced, which product may be liquid, pasty, granular or powder.

Depending on the nature of this product, the package 20 once sealed can be subjected to further treatment or be transferred to storage. For example if the product is to be consumed in the liquid state (shampoo, detergent, milk, water, etc.) or granular or powder, it can be stored directly. If the product has been temporarily heated to bring it to the liquid state, although being solid at ambient temperature (chocolate or cheese or soap), it is sufficient to wait for it to cool in order for it to assume and maintain the shape of the package 20, which it does even after it has been removed for consumption. If however the product is a liquid for preparing an ice-cream or ice-lolly, it has to be frozen after filling, however this can be done shortly before consumption.

Briefly, independently of the product to be packaged, this first embodiment of the method according to the invention is based on the principle of using polyethylene, the traditional purpose of which is to impermeabilize the yieldable paper against the liquid product during its filling and storage, but also to impermeabilize the paper against the air, hence enabling paper to be subjected to an operation which was never previously possible.

If it is foreseen that the package could receive an extensive deposit of moisture (condensate), it is preferable for the layer of yieldable paper 4 to comprise a polyethylene film 6 on both its surfaces.

A second embodiment of the method according to the invention foresees that, after thermowelding the polyethylene, the fluid fed under pressure through the duct 18 is not air, but instead the actual liquid product to be packaged, this causing the paper to stretch until it adheres to the walls of the half-moulds 10. Again in this case the product to be packaged can be variously treated depending on its nature, but in all cases the invention comprises the formation of the package within the mould by the actual product to be packaged. If this product is solidifiable, ie whether it is solid at ambient temperature but has been previously heated to facilitate filling, or whether it is liquid at ambient temperature but is to be refrigerated after filling, the invention involves mutual action between the liquid and the package. In this respect, during the filling the liquid product forces the paper and the polyethylene to assume the shape imposed by the mould within which it is housed, whereas during solidification it is the package, previously formed by the liquid, which now constitutes the mould for the liquid during the solidification.

In addition, in both the embodiment of the method according to the invention, in particular for packaging edible solidifiable liquid products, the filling stage can be preceded by inserting a traditional stick 21 for example of wood or plastic into the mould, to remain retained by the product as it solidifies and form the support necessary for hand-held products.

A third embodiment of the method according to the invention foresees that the leaf of composite 2 is faced with the layer of paper 4 to the cavity 22 of a mould 24 and then is bounded in correspondence of the continuous edge of this cavity. Subsequently the mould 22 is subjected to depression through suitable suction channel 26 provided threin so as to cause the tangential stretching of said composite until to obtain its adhesion to the inner surface of this cavity. In order to obtain a better stretching it is foreseen that a complementary punch 28 faces the cavity 22 of the mould, which during the suction step contributes, through mechanical way, to carry out the stretching of the paper.

It is preferable that such a mechanical effect is supported by a pneumatic effect, and for this purpose the punch 28 is provided with a plurality of channels 30, through which it is possible to direct a jet of air, if desired hot, against the composite leaf.

The valve-shaped package 32 so obtained may be filled with the product to be packaged and subsequently may be closed through thermowelding of a transparent film 34 or of a complementary valve.

It any event, independently of the embodiment used, the composite according to the invention and the method to realize the desired prackages have considerable advantages, and in particular:

they enable packages to be formed practically without any limitation on their shape, they enable traditional commercially available forming and filling equipment to be used, they enable very light packages of low cost to be formed, which can be reduced to a minimum volume after use.

What is claimed is:

1. A paper composite for realizing three-dimensional soft packages comprising a layer of yieldable paper having a degree of yieldingness in the longitudinal and transverse directions not less than 10% and of at least an impermeabilizing film having a yieldingness not less than that of the yieldable paper.

2. A paper composite as claimed in claim 1, wherein said impermeabilizing film comprises a thermoformable and thermoweldable material.

3. A paper composite as claimed in claim 2, wherein said impermeabilizing film comprises polyethylene.

4. A paper composite as claimed in claim 1, wherein said impermeablizing film comprises an aluminum alloy.

5. A method for realizing packages through a paper composite according to claim 1, comprising the steps of:

positioning a leaf of composite in a cavity of a mould, said mould having two half-moulds, said leaf being disposed so that an edge of said leaf corresponds to a continuous edge of said cavity, and subsequently tangentially stretching said leaf of composite to adhere to an inner surface of said cavity to obtain a concave valve having a shape of said cavity, and said concave valve being sent through the steps of filling and closure.

6. A method as recited in claim 5, wherein said mechanical pushing is accompanied by insuflatting, through said punch, a jet of compressed air against said leaf of paper composite.

7. A method as claimed in claim 6, wherein said jet of compressed air is hot air.

8. A method as claimed in claim 5, wherein after filling, said concave valve is closed with a sheet of thermoweldable material applied to an edge of said concave valve.

9. A method as claimed in claim 5, wherein after filling, said concave valve is closed with a second concave valve placed over said concave valve and thermowelded together along touching edges.

10. A method as claimed in claim 5, comprising the steps of:

bringing two of said leaves of composite material together so that thermoformable and thermoweldable plastic films of each leaf of composite are in mutual contact, welding said two leaves together along a perimeter line of predetermined pattern comprising at least one interruption formed on said two of said leaves, introducing a pressurized fluid through said interruption into a space bounded by said leaves maintained between two closed half-moulds, forming a cavity between said half-moulds, said cavity being bounded by said perimeter welding line, to stretch said leaves to that said leaves adhere to walls of said cavity, filling a volume limited by said leaves with a product to be packaged, and welding said perimeter line completely across said interruption.

11. A method as claimed in claim 10, wherein said two leaves are obtained by longitudinally folding a continuous web.

12. A method as claimed in claim 10, wherein said two leaves are welded together along said perimeter line by thermowelding.

13. A method as claimed in claim 10, wherein said two leaves are welded together while retained between said half-moulds.

14. A method as claimed in claim 10, wherein said two half-moulds are kept hot while injecting said fluid.

15. A method as claimed in claim 10, wherein said two leaves each comprise a layer of yieldable paper joined to two plastic films applied to both sides of said layer of yieldable paper.

16. A method as claimed in claim 10, wherein said fluid is compressed gas.

17. A method as claimed in claim 16, wherein said compressed gas is heated.

18. A method as claimed in claim 10, wherein said fluid is said product to be packaged.

19. A package obtained through the method as claimed in claim 5, comprising a concave container having a closure film applied to an edge of said container after filling.

20. A package obtained through the method as claimed in claim 5, comprising two concave valves joined together along facing edges.

* * * * *